July 23, 1940.  A. RONNING  2,208,599

VEHICLE STEERING TRUCK

Original Filed July 15, 1938

Inventor
ADOLPH RONNING
By Carlsen & Hazle
Attorney

Patented July 23, 1940

2,208,599

UNITED STATES PATENT OFFICE 2,208,599

VEHICLE STEERING TRUCK

Adolph Ronning, Minneapolis, Minn.

Original application July 15, 1938, Serial No. 219,369. Divided and this application November 28, 1938, Serial No. 242,725

3 Claims. (Cl. 280—87)

This invention relates to improvements in vehicle steering trucks.

The invention more particularly relates to improvements in mounting and support means for the relatively closely spaced front wheels of tractors of the row crop type and the primary object is to provide means whereby these wheels may be allowed freedom of movement in vertical planes to compensate for inequalities in the ground surface over which they travel. In the ordinary assembly the wheels are mounted in close transverse spacing upon rigid, laterally extended spindles at the lower end of the steering post or shaft and, as a result, when either wheel meets with a rise in ground it has a tendency to raise the other from ground engagement, thus elevating the frontal end of the tractor and putting uneven transverse stress upon the steering assembly. In accordance with its primary object, however, my invention eliminates this difficulty by providing that the wheels may move vertically and oppositely to maintain ground engagement at all times and without disturbing the normal equilibrium of the tractor.

Another and important object of my invention is to provide wheel mounting means for this purpose in which sufficient clearance is provided to enable the steering truck to be steered to sharp angles. The invention is thus particularly applicable to tractors of the modern types in which rear or traction wheel braking is used to facilitate sharp turning.

A further object is to provide supporting means for the wheels in which the working parts movably supporting the wheels are located below the vehicle frame and other rigid parts of the steering assembly, so that the aforesaid sharp steering angles of the wheels may be obtained without interference from any part of the vehicle.

A further object is to provide, in a steering truck assembly of this kind, means for yieldably cushioning the truck against vertical movements relative to the tractor and thus providing for shock absorption as the wheels pass over inequalities in the ground surface.

Still a further object is to provide supporting means for the wheels, which includes flexible members having the property of permitting minor vertical movements of the wheels sufficient to absorb the shocks and jars incident to travel of the wheels over the ground.

These and other more detailed and specific objects will be disclosed in the course of the following specification, reference being had to the accompanying drawing, in which—

Figure 1:
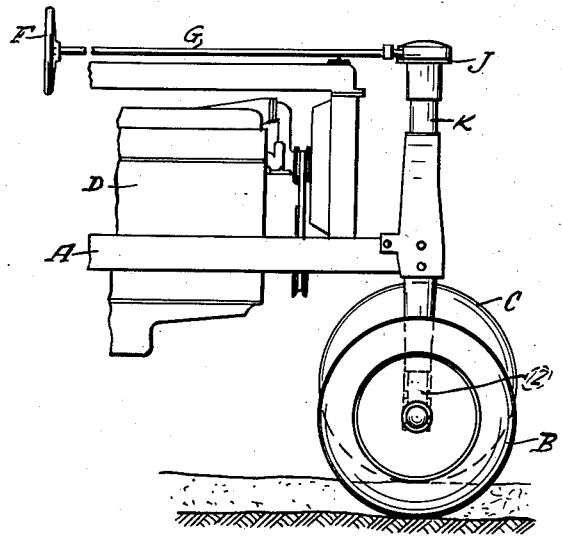
Fig. 1 is a side view of the frontal end of a row crop tractor equipped with my invention, the near front wheel being shown as running at a lower level than the far wheel, due to transverse inequality in the ground surface.
Figure 2:
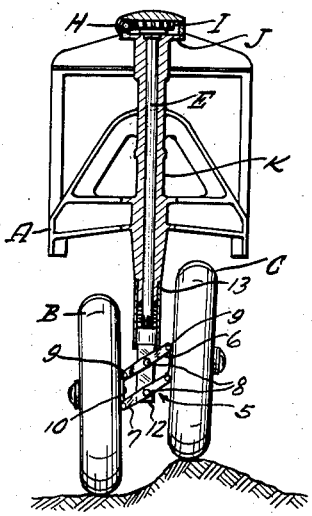
Fig. 2 is a front elevation of the assembly shown in Fig. 1.

It may be noted at this point that this is a division of my parent copending application, Serial Number 219,369, filed July 15, 1938, to which attention is invited for comparative purposes.

Referring now more particularly to the drawing, my invention is shown as applied to a tractor of the modern row crop type which includes the main frame A supported at the rear by traction wheels (not shown) and at the front by the closely spaced front wheels B and C. The tractor is driven by the power unit D and is steered by oscillation of the vertically axised steering post or steerable member E to the lower end of which the wheels B and C are mounted. This steering operation is controlled by a rearwardly located steering wheel F connected by a steering shaft G to a worm H meshing with a worm gear I affixed atop the steering post E within a housing J. The steering post is journaled in a vertical tubular housing K rigidly supported in the tractor frame and depended therebeneath between the upper portions of the wheels B and C, but terminated some distance above the level of the axis on which said wheels roll.

The foregoing is substantially the conventional assembly of these parts, and ordinarily the wheels B and C are journaled on a short transverse axle secured rigidly to the lower end of the steering post E. In accordance with my invention, however, I provide in lieu of this rigid mounting a movable differential-acting mounting, which is indicated generally at 5, and which will now be described in detail.

This mounting comprises as its essential parts the vertically spaced levers or lever members 6 and 7 which are fulcrumed intermediate their ends on horizontal axes at 8 and extend laterally and transversely at each end from the steering assembly. At their outer ends these levers 6 and 7 are pivotally connected at 9 to connectors or blocks 10 which in turn carry the outwardly extended spindles 11 (only one of which is shown) upon which the hubs of the wheels B and C are journaled. This arrangement is such that, as either wheel is displaced vertically by meeting a rise in ground, the other wheel is lowered a corresponding amount to maintain contact with the ground. The levers 6 and 7 thus act to reversely translate vertical movement of either wheel to the other in a differential manner. This action takes place without raising or lowering the tractor per se, and as a result side hill slippage of the tractor is prevented, and the steering is materially aided.

An important feature of my invention resides in the fact that the entire movable supporting means for the wheels B and C, comprising the levers 6 and 7 and connected parts, are positioned below the level of all rigid parts of the tractor frame and steering post housing. Also the outside diameter of the wheels B and C is considerably less than the height of adjacent frame parts. These two factors make it possible to steer the front wheel assembly over a wide range and at a sharp angle to either side without interference in any way from the frame of the tractor, as will be clearly evident, and this action is true even when one wheel, due to riding over a rise of ground, has been elevated considerably above the other. This feature further, as heretofore stated, makes my invention particularly suitable for use upon modern tractors wherein rear wheel braking of either wheel (the one at the inside of the turn) is used to facilitate sharp turning of the tractor.

Figure 3:
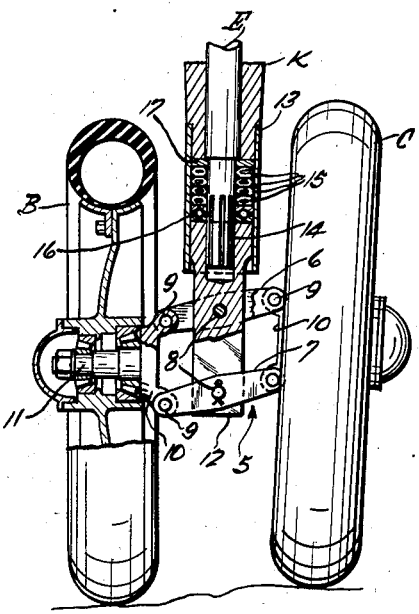
Fig. 3 is an enlarged frontal elevation partially in vertical transverse section, of the lower part of the wheel supporting assembly shown in Figs. 1 and 2.

Referring particularly to Fig. 3, it will be seen that the levers 6 and 7 are provided in identical pairs on both front and rear faces of a mounting member 12 which has its upper end slidably and rotatably inserted into a depended tubular extension 13 of the steering post housing K. This upper end of the member 12 is also slidably keyed or splined at 14 on the lower end of the steering post E so that, as the post is turned by rotation of the steering wheel F, the member 12, and of course the levers 6 and 7 and wheels B and C, will be oscillated in a horizontal plane for steering purposes. At the same time the member 12 has freedom for vertical sliding movement upon the steering post, and this action is limited in an upward direction by the bearing of the member against air cushions, or "doughnuts", 15 located in the extension 13 around the steering post E. The member 12 has direct bearing upon a ball thrust bearing 16, and the uppermost cushion 15 bears against a collar 17 and the lower end of the housing K. This arrangement provides for the resilient cushioning of the tractor against the shocks occasioned by travel of the front wheels over rough ground but without interfering in any way with either the steering action or differential vertical movements of the wheels. The air cushions 15 may obviously be replaced with any other yieldable cushioning means such as springs, or hydraulically operating means, if so desired.

The spindles 11, as shown in Fig. 3, incline downwardly from the horizontal toward their outer ends so as to camber the wheels B and C inwardly toward each other at their lower portions.

Figure 4:
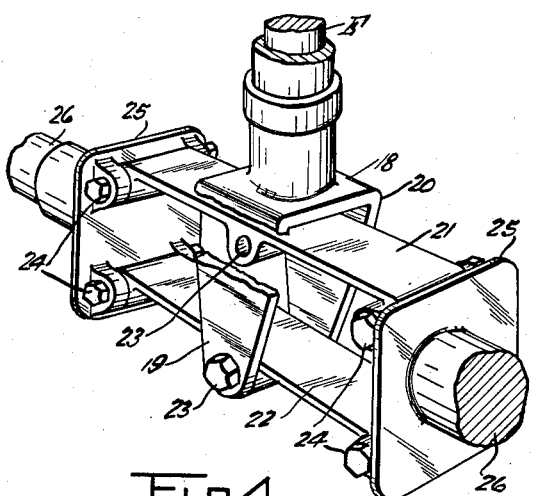
Fig. 4 is an enlarged, fragmentary, perspective view of a modified form of wheel mounting and supporting means, which involves the rise of flexible members for shock absorption.

The assembly shown in Fig. 4 is quite similar in operation to that previously described and comprises a mounting member 18 in the form of a downwardly opening fork and which is rigidly connected to the steering post E to turn therewith. Between the ends 19 and 20 of the forked member 18 the levers 21 and 22 are fulcrumed at 23 in vertically spaced relation and extend laterally therefrom to their pivotal connections at 24 with the connectors 25 carrying the wheel mounting spindles 26. The levers 21 and 22 will thus act exactly as heretofore described to translate opposite vertical movements to the wheels carried by the spindles 26. These levers 21 and 22 are, however, made of flat leaf spring material, such as steel, and are disposed in horizontal planes in such manner that their outer ends may flex vertically and absorb road shocks from the wheels. This assembly, of course, may be used in lieu of the cushioned support shown in Fig. 3, in which case no vertically slidable connection to the steering post is needed.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a vehicle, a member mounted therein for turning movement about a generally upright axis, a pair of vertically spaced leaf spring levers medially fulcrumed to the member and turnable therewith, said levers lying in horizontal planes whereby their outer ends may be flexed vertically with respect to their fulcrums, and ground wheels mounted on the outer ends of the levers.

2. In a vehicle having a frame, a member journaled in the frame, a pair of vertically spaced levers medially fulcrumed to the member and extending laterally to both sides thereof, connectors between corresponding ends of the levers, and ground wheels rotatably secured to the connectors, said levers being formed of spring steel, flexible in a vertical plane, so as to constitute a resilient mounting for the said frame and member with respect to the connectors.

3. In a vehicle, a steering post mounted forwardly therein, a mounting connected with and extending below the post, a pair of vertically spaced levers fulcrumed in the mounting and extending laterally in both directions therefrom, and ground wheels mounted on the outer ends of the levers, said levers being formed of flat spring steel capable of vertical flexing only.

ADOLPH RONNING.